B. Holly,

Water Supply Regulator.

No 4086. Reissued Aug 2. 1870.

Witnesses.
R. T. Campbell.
J. H. Campbell.

Inventor
Birdsill Holly
by
Mann, Fenwick & Hammer

N. PETERS, PHOTO-LITHOGRAPHER, WASHINGTON, D. C.

UNITED STATES PATENT OFFICE.

BIRDSILL HOLLY, OF LOCKPORT, NEW YORK.

IMPROVEMENT IN WATER-SUPPLY REGULATORS FOR WATER-WORKS.

Specification forming part of Letters Patent No. 87,413, dated March 2, 1869; reissue No. 4,056, dated August 2, 1870.

DIVISION B.

*To all whom it may concern:*

Be it known that I, BIRDSILL HOLLY, of Lockport, in the county of Niagara and State of New York, have invented a new and Improved Water-Supply Regulator for Water-Works; and I do hereby declare that the following is a full, clear, and exact description thereof, reference being had to the accompanying drawing forming part of this specification, in which—

Figure 1:
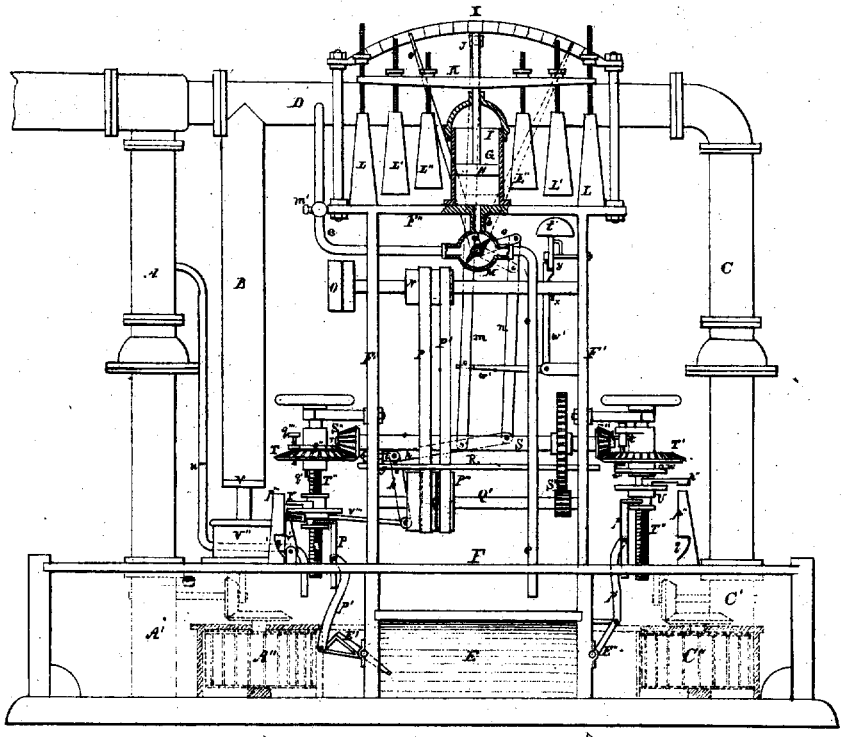
Figure 2:
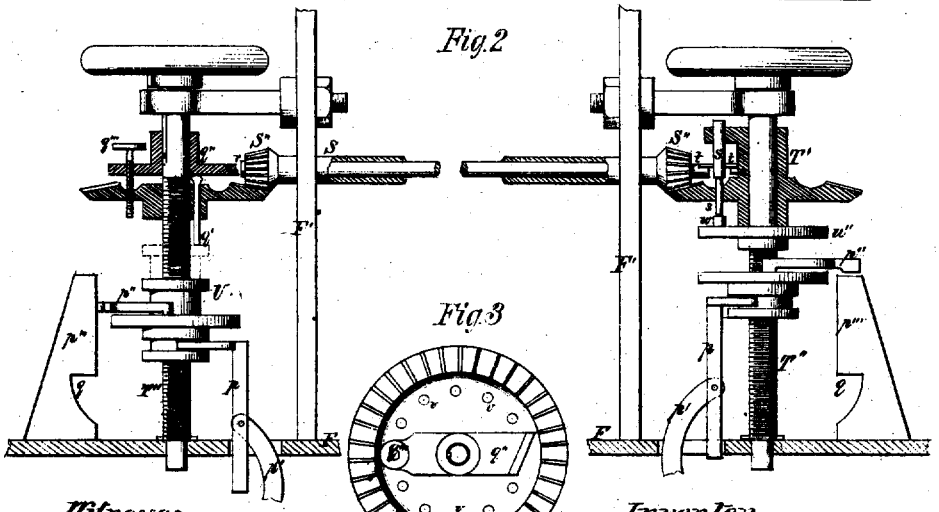
Figure 3:
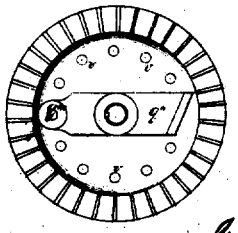

Figure 1 is a front view of my invention. Fig. 2 is a front elevation of the gate-operating mechanism, showing more in detail, and with certain parts of the same exhibited in section. Fig. 3 shows in detail a top view of the wiper for setting the auxiliary gate mechanism in operation.

The general object of this entire invention will be fully understood by referring to subdivision A of this reissue. The more particular subject-matter of this subdivision is the contrivance by which the compensating or restoration process can be carried into effect, so that when the pressure of water in the pipes becomes greater or less than that which is desired, the proper degree of that pressure may be automatically restored. For example, if it be desirable to preserve a pressure of forty pounds to the square inch in the main pipe D, we set the index-lever $o'$ at the figure 40 on the graduated scale X. This will partially close the orifice leading to the exit-pipe $e$, but will still allow sufficient escape of water to render the pressure in the water-gage M, and therefore in the cylinder G, considerably less than forty pounds to the inch. Suppose this pressure to be twenty pounds per inch, and that all parts of the machine have become accommodated to that pressure. It was stated in subdivision A of this reissue that under such circumstances, if for any cause, a greater or less pressure were created in the pipe D, an automatic arrangement would be set in operation which would soon restore the desired degree of pressure.

I shall now proceed to describe that arrangement.

N is a drum, fixed upon a shaft which is driven by the pulley O. Around this drum are passed two belts, P and P′, the latter of which is crossed, and each of which is made to drive one of the three pulleys on the shaft Q′. Of these three pulleys, P″ and P‴ are loose; the remaining one, Q, is fast upon the shaft. When the machine is running quietly these belts drive the loose pulleys, and the shaft Q′ is at rest. But when in this condition of things the pressure in the pipe D becomes diminished, the piston H is drawn downward by the weights L L′ L″, carrying with it the rod $m$, which causes the arm $h$ to turn around the pivot $i$. The stud $g$, which works loosely in a hole in the belt-shifter R, moves that belt-shifter to the left, and soon shifts the belt P′ to the fast pulley Q, setting the shaft Q′ in motion, which, through the gearing S′, causes the shaft S to revolve in the opposite direction. This shaft carries the bevel-pinions S″ S″, which engage with the bevel-wheels T T′, causing those wheels to revolve. Each of these bevel-wheels is made to turn loosely on its shaft. But the wiper $q''$ on the left-hand shaft (see Fig. 2,) is attached to its shaft by a feather, so that while it will slide freely up and down the shaft, it always turns therewith. Through one end of this wiper is fixed the screw $q'''$, the lower end of which passes through a hole in the bevel-wheel T, so that while this screw is in that position this wheel T will, in its revolution, carry with it the threaded shaft T″. The threaded shaft T″ is furnished with a boss, U, through which the shaft passes, so that if, while that shaft revolves in one direction, the boss U is prevented from revolving with it, that boss will constantly rise along the shaft T″, and if that shaft revolves in the opposite direction in like circumstances, the boss U will settle down along the shaft, and, inasmuch as it is connected with the gate E′ by means of the clutch-rod $p$ and link $p'$, the raising or lowering of this boss will open or close that gate, so as to give greater or less motion to the turbine A″, which drives the pumps. Now, when the threaded shaft T″ revolves, the boss U is prevented from revolving by means of the arm $p''$, which slides in contact with the standard $p'''$, which standard and arm are so constructed and adjusted that when the gate E′ is closed this arm will have risen above the standard, and when this gate is wide open, the arm will have descended to its notch $q$, so that in either case the boss to which it is attached will no longer be prevented from revolving, and consequently the gate with which that boss is connected will remain stationary. This arm $p''$ is so constructed that it will readily spring up or down. The top of the standard $p'''$ is slightly beveled, so that the end of the arm will pass over it like a door-latch, and immediately fall back to its position, so that if the shaft T″ is revolved in the contrary direction, this arm will engage with the standard $p'''$ and prevent the boss U from revolving with it, and will commence descending. A corresponding arrangement operates when this arm reaches the notch $q$ in its descent along the standard $p'''$.

Now, in the case we have been considering, the pressure in the pipe D is supposed to be below its normal degree. The belt-shifter has thrown the belt P′ upon the fast pulley Q, which has caused the bevel-wheel T and shaft T″, to revolve in such a direction as to open wider the gate E′, which will increase the motive power of the pump, and restore the proper amount of pressure in the pipe D; but if that pressure should become greater than the degree desired, the piston H would rise above its normal position, which would raise the arm $h$. This would move the belt-shifter R to the right, and the belt P would be brought upon the fast pulley. This would move the machinery in the opposite direction, as this belt P is not crossed, and would soon close the gate E′ sufficiently to restore the due degree of pressure in the pipe D. The piston H would fall to its proper place, and the belt P would be moved back to the loose pulley P″.

I have thus shown the arrangement and operation of the machinery upon the left-hand side of the drawing, Fig. 1. A like arrangement is shown upon the right-hand side of that drawing, for the purpose of increasing or diminishing the motion of the turbine C″, and corresponding devices can be readily contrived to open and close a throttle-valve, so as to adapt the machinery to the use of steam, instead of water, as a motive power.

The operation above described only relates to the movement of one of the gates in the machine. This will be found sufficient to preserve uniformity of pressure in all ordinary cases.

I shall now proceed to show how to operate upon the gate E″ and turbine C″ when that becomes necessary. Suppose both of these gates E′ and E″ to be open partially or entirely, and that the pressure upon the pipe D has, from the closing of hydrants or otherwise, become suddenly increased above the degree at which it has been standing and is intended to stand. The rising of the piston H will carry the belt P upon the fixed pulley, and cause the threaded shaft T″ to revolve in the direction which will raise the boss U, and commence closing the gate E′. When this boss has risen sufficiently to elevate the arm $p''$ high enough to pass over the top of the standard $p'''$, the boss will turn with the threaded shaft, and will cease to rise farther; but by that time this boss will have risen, as shown in dotted lines in Fig. 2, sufficiently to raise the wiper $q''$ so high that the beveled end will have moved the rod $r$ through the hollow shaft S, so that the other end of this rod shall have encountered the tripping device, that is intended to arrest the loose motion of the bevel-wheel T′, and cause it to set in motion the threaded shaft T″. This tripping device is composed of a small shaft, $s$, with two studs, $t$ $t$, on opposite sides, one of which, resting on the projection $u$, holds the shaft so high that its lower end will pass over the top of the stud $u'$; but when tripped, as aforesaid, the lower end of this shaft drops so low as to engage with this stud $u'$. This will cause the threaded shaft T″ to revolve, and thus raise the boss U and close the gate E″ until the pressure upon the pipe D becomes sufficiently reduced.

It would be possible to construct machinery that would automatically reverse the motion just described, and transfer such reversed action from the right to the left side of the apparatus, as shown in the drawings; but the parts would be somewhat complicated, and I prefer adjusting it by hand when such transfer becomes necessary.

Instead of arranging the machinery to close the gates in the manner above described, the parts may be so contrived and adjusted as to transfer the action from one side to the other automatically in the process of opening instead of closing the gates.

Having described this portion of my invention, what I claim as new, and desire to secure by Letters Patent in this subdivision, is—

1. The piston H and belt-shifter R, with the intermediate contrivances, in combination with the two belts P P′ and the pulleys Q, P″, and P‴, the whole so constructed, arranged, and adjusted that the machinery which operates to open and close the gates E′ and E″ may be allowed to stand still, or to move in the one or the other direction, in order to preserve uniformity of pressure in the pipe D, or to restore that pressure automatically when it has varied from the proper standard.

2. The bevel-wheel T, which can be made fast to the threaded shaft T″, in combination with the boss U, which can be made to rise or descend along the said shaft, according as the bevel-wheel T is moved in the one or the other direction, substantially as shown.

3. The boss U, arm $p''$, and standard $p'''$, so arranged that the boss U shall not be permitted to turn with the threaded shaft, which passes through it, until it has reached a fixed elevation or depression, in the manner and for the purpose described.

4. The boss U, clutch $p$, and link $p'$, to open and close the gate E′, in the manner and for the purpose above described.

5. The boss U, pin $q'$, wiper $q$, and rod $r$, constructed and arranged, as described, for the purpose of transferring the action of the machinery to the other side of the apparatus, as above shown.

BIRDSILL HOLLY.

In presence of—
C. G. HILDRETH,
F. T. SCOVELL.